INVENTOR:
ERNEST STERN,
BY Marvin Goldenberg
HIS ATTORNEY.

INVENTOR:
ERNEST STERN,
BY Marvin D. Goldenberg
HIS ATTORNEY.

INVENTOR:
ERNEST STERN,
BY Marvin L. Goldenberg
HIS ATTORNEY.

INVENTOR:
ERNEST STERN,
BY Marvin L. Goldenberg
HIS ATTORNEY.

United States Patent Office 3,249,882
Patented May 3, 1966

3,249,882

SPIN AND PHONON SPIN TRAVELING WAVE PARAMETRIC AMPLIFIERS AND SPIN WAVE DELAY LINES

Ernest Stern, New Rochelle, N.Y., assignor to General Electric Company, a corporation of New York Filed Dec. 17, 1962, Ser. No. 245,012
2 Claims. (Cl. 330—4.6)

This invention relates to ferromagnetic spin-wave devices and more particularly to novel microwave devices which provide efficient coupling between microwave electromagnetic energy and ferromagnetic spin-waves.

The classical concept of electron spins and spin-waves is commonly employed for providing satisfactory explanations of many phenomena that are observed with respect to the magnetization of a ferromagnetic body. In the well known classical electron spin concept, the free and bound electrons of a ferromagnetic body are each said to be constantly spinning on their axes. Each electron, therefore, may be presumed to be a tiny dipole having a dipole moment oriented along the axis of spin. When considering an unmagnetized ferromagnetic body, the electron spin axes, grouped in accordance with the various domains of the body, assume random directions so that the net dipole moment of the body is zero. Under the application of a magnetic field, these axes will align in the direction of the magnetic field so as to produce a finite net dipole moment which is a function of the magnetizing field and the configuration and material characteristics of the ferromagnetic body. Under the application of a saturating D.-C. magnetizing field and a variable magnetic field in a direction orthogonal to that of said magnetizing field, the electron spins will precess about their respective axes. When the deviations of the precessing spins vary in phase periodically throughout the ferromagnetic body a spin-wave is created, the wavelength thereof being the distance between planes of equal phase.

With an orthogonal R–F magnetic field applied of a frequency commensurate with the ferromagnetic resonant frequency of the ferromagnetic body, a uniform precession of the electron spins and magnetostatic spin modes can be excited. The uniform precession is essentially a spin-wave of infinite wavelength. The magnetostatic modes are essentially spin-waves of relatively long wavelength on the same order of the dimensions of the ferromagnetic body. Hence, magnetostatic waves are a form of standing waves. Uniform precessions may be readily excited and coupled to by an R–F magnetic field, e.g., the magnetic field of microwave electromagnetic energy. It may be also noted that magnetostatic modes may also be readily excited by an R-F magnetic field since the resonant frequency of these modes have wavelengths corresponding to the wavelengths of readily generated microwave electromagnetic energy. The energy of the uniform and magnetostatic modes, a quantum of which is referred to as a magnon, interacts with the crystalline lattice of the ferromagnetic piece to produce phonons (quantums of acoustic energy) and with itself to produce additional magnons. Under the application of a uniform orthogonal field this interaction is incoherent and ultimately results in dissipation of the applied energy as thermal energy.

Coherent spin-waves of short wavelengths cannot be readily or efficiently excited by a uniform R–F magnetic field, primarily because the wavelengths of these spin-waves are normally orders of magnitude smaller than the wavelengths of readily generated electromagnetic microwave energy, the shortest wavelengths being on the order of atomic dimensions. In the present discussion by short wavelengths it is meant wavelengths considerably shorter than the wavelengths of electromagnetic energy of equal frequency and which are capable of propagation through a ferromagnetic piece. It is desirable to be able to efficiently couple electromagnetic energy to the short wavelength spin-waves for a number of reasons. Primarily, it is desirable to couple to these short wavelength spin-waves because they can be propagated slowly through the ferromagnetic body and can be made to interact with acoustic waves without appreciable energy dissipation. These properties can be made use of in devices as microwave delay lines, parametric amplifiers and electromagnetic-phonon transducers.

Efficient excitation of the short wavelength spin-waves has not been possible in the prior art. A number of techniques have been attempted such as driving the ferromagnetic material with R–F magnetic fields at elevated power levels which excite a spectrum of spin-waves degenerate with the uniform mode. These various techniques, however, have been found to be very inefficient and an appreciable portion of the applied energy is dissipated in undesirable and incoherent spin-wave modes.

Accordingly, it is an object of the invention to provide novel ferromagnetic spin-wave devices in which efficient coupling is provided in a ferromagnetic body between applied microwave electromagnetic energy and short wavelength spin-waves of comparable frequency.

Another object of the present invention is to provide novel ferromagnetic spin-wave devices in which microwave electromagnetic energy can be coupled to spin-waves propagating within a ferromagnetic body at phase velocities commensurate with the phase velocities of excited acoustic waves of the same frequency to provide for an energy exchange therebetween.

It is another object of the present invention to provide novel ferromagnetic spin-wave delay lines in which microwave electromagnetic energy is efficiently coupled to spin-waves of short wavelength which can be propagated as extremely slow waves through a ferromagnetic body.

It is a further object of the invention to provide novel ferromagnetic spin-wave parametric amplifiers in which microwave electromagnetic energy is efficiently coupled to short wavelength parametrically interacting spin-waves within a ferromagnetic body.

Briefly, these and other objects of the invention are accomplished by applying an inhomegeneous D.-C. magnetizing field to a ferromagnetic body, for example, ytrrium iron garnet or a ferrite type material, and applying a varying magnetic field, such as the magnetic field component of electromagnetic microwaves, in a direction orthogonal to said magnetizing field for efficiently exciting spin-waves of short wavelength which can be propagated through said ferromagnetic body. The D.-C. magnetizing field has a magnitude at the input and output end portions of the ferromagnetic body so as to support at the end portions excitation of the uniform precessional mode, and is modified toward the center of the ferromagnetic body for supporting excitation of short wavelength spin-waves which are propagated through the body, energy from the uniform mode initially excited being transferred to the short wavelength spin-waves.

In accordance with a more specific aspect of the invention a microwave delay line is provided employing a relatively small ferromagnetic body in which spin-waves are excited by microwave electromagnetic energy under the application of an inhomogeneous D.-C. magnetizing field, as described above, said spin-waves being slowly propagated through the ferromagnetic piece to provide delay and then reconverted to electromagnetic energy.

In accordance with a further aspect of the invention there is provided a parametric amplifier including a ferromagnetic body in which slowly propagating spin-waves are excited by microwave electromagnetic energy under the application of an inhomogeneous D.-C. magnetizing field. A helix is wrapped around said body for propagating electromagnetic energy. The propagating spin-waves and electromagnetic energy are provided with phase velocities for producing parametric interaction therebetween.

In accordance with another aspect of the invention a parametric amplifier is provided including a ferromagnetic body in which slowly propagating spin-waves are excited by a first input microwave electromagnetic energy and in addition propagating phonon waves are excited by a second input of electromagnetic energy. There are provided phase velocities of the propagating spin and phonon waves that will produce parametric interaction.

While the specification concludes with claims particularly pointing out and distinctly claiming the subject matter which is regarded as the invention, it is believed that the invention will be better understood from the following description taken in connection with the accompanying drawings in which:

Figure 1:
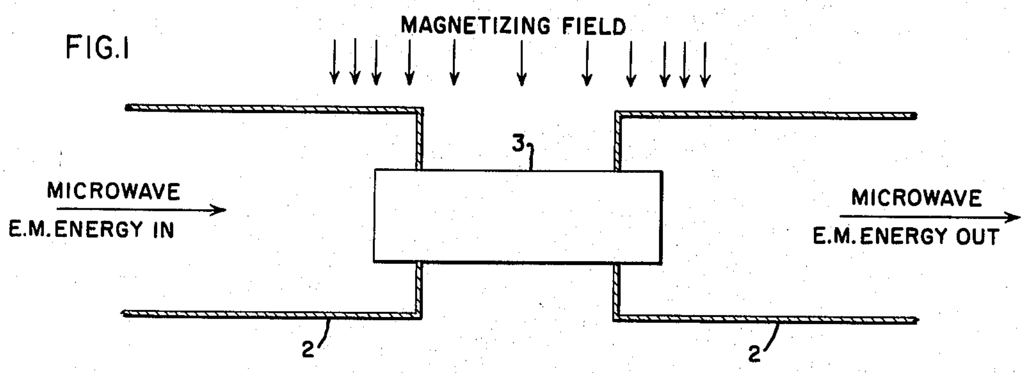
FIGURE 1 is a schematic diagram of a ferromagnetic spin-wave delay line in accordance with one embodiment of the invention.

Referring now to FIGURE 1, there is illustrated one exemplary embodiment of the invention relating to a ferromagnetic spin-wave delay line. Microwave electromagnetic energy is transmitted through a waveguide 2, coupled to the entrance region of a ferromagnetic body 3 for propagation therethrough in the form of spin-waves, and is coupled back to electromagnetic energy at the exit region of the ferromagnetic body 3. Although a waveguide is illustrated, other conventional media for propagating microwave electromagnetic energy may be employed, e.g., strip lines or coaxial cable. The ferromagnetic body should be a low loss dielectric material preferably having high Q properties for both spin-wave and acoustic energy such as an yttrium iron garnet (YIG) or one of the well-known ferrite materials. YIG is preferable because of its extremely high Q properties and high magnetoelectric constant. The configuration of the body 3 may be in the form of a cylindrical rod, rectangular slab, circular disk or other suitable shape. In the embodiment being considered a rod sample is referred to, having dimensions of about one quarter inch in length and one eighth inch in diameter. (It is noted that larger YIG samples are also available at the present time.)

A saturating inhomegeneous D.-C. magnetizing field applied in the Z direction, as indicated by the arrows, is employed for exciting short wavelength spin-waves in the ferromagnetic body 3, said wavelengths typically being orders of magnitude less than the longitudinal dimension of the ferromagnetic piece, whereby said short wavelength spin-waves are propagated through the rod 3 in the longitudinal or Y direction as traveling waves. The phase velocities of short wavelength propagated spin-waves are considerably lower than the velocities of comparable frequency microwave energy in a waveguide so that relatively long delays from a few microseconds to on the order of fifty microseconds may be provided by small ferromagnetic bodies.

The nonuniform D.-C. magnetizing field has a magnitude at the end regions of the ferromagnetic body that is necessary for supporting excitation of the uniform precessional mode at the frequency of the applied microwave electromagnetic energy. The field magnitude is modified toward the central region of the body so as to support excitation of short wavelength spin-waves at the given frequency. Specifically, in the embodiment under consideration the field is of relatively large magnitude at the ends of the ferromagnetic body, tapering off towards the center from either end to a fixed magnitude that is considerably smaller. The D.-C. magnetizing field effectively controls the stiffness of the electron spins. Accordingly, the magnitude of the D.-C. field at the end regions of the sample is related to and determines the ferromagnetic resonant frequency of the uniform precessional modes so that for a given resonant frequency there is a corresponding field. This field is termed the resonant field $H_{res}$ and may be related to the resonant frequency $\omega_{res}$ by the expression:

$$\omega_{res}=\gamma H_{res} \quad (1)$$

where $\gamma$ is the gyromagnetic ratio of the material. In addition, the magnitude of the internal magnetizing field $H_1$, in the center region of the sample, is related to and determines the wavelength of the spin-waves that can be excited. The internal magnetizing field $H_1$ may be expressed as:

$$H_1=H_o-N_z 4\pi M \quad (2)$$

where $H_o$ is the magnitude of the externally applied field; $N_z$ is the shape demagnetizing factor of the ferromagnetic sample in the Z direction; and M is the net dipole moment of the ferromagnetic sample. The resonant magnetizing field may be expressed as:

$$H_{res}=[(H_1+N_x 4\pi M)(H_1+N_y 4\pi M)]^{1/2} \quad (3)$$

where $N_x$ and $N_y$ are the shape demagnetizing factors in the X and Y directions, respectively.

The required field configuration for exciting a uniform precessional mode at the end regions of a sample and short wavelength spin-waves in the central region may be provided by a uniform external field in combination with a non-ellipsoidal sample configuration of the proper shape and dimensions wherein the nonuniform demagnetizing field of the sample, as determined by the shape demagnetizing factors, is relied upon to properly modify the resonant and internal fields. Alternatively, a nonuniform external field can be employed where the demagnetizing field is uniform or very small, or a combined nonuniform external and demagnetizing field may be used.

Figure 2:
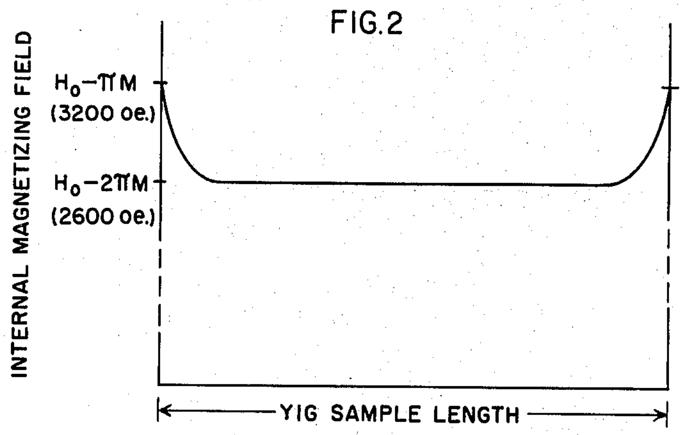
FIGURE 2 illustrates the internal magnetizing field configuration associated with FIGURE 1.

A typical internal magnetizing field configuration along an yttrium iron garnet sample is given in FIGURE 2 wherein the maximum internal field of approximately 3200 oersteds is provided at the end regions of the sample, tapering off to a constant internal field of approximately 2600 oersteds and the central region. Such field configuration is readily provided by a uniform external magnetizing field along the rod length wherein the demagnetizing field of the rod provides the requisite nonuniformity of the internal field. Typically such external field can be applied by positioning the sample between the pole pieces of an electromagnet. It is noted, with respect to a rod sample, that nonuniform demagnetizing field effects also exist in the transverse direction. Although these field effects are tolerable, if desired they can be readily reduced or eliminated by, e.g., modifying the external field in the transverse direction.

Referring again to FIGURE 2, for an R-F magnetic field component of the applied electromagnetic microwave having a frequency of about 9400 mc./sec., a resonant magnetizing field of approximately 3000 oersteds is required. This field strength will be seen to be provided by the field configuration shown at regions disposed slightly inward from the end surfaces of the sample.

Figure 3A:
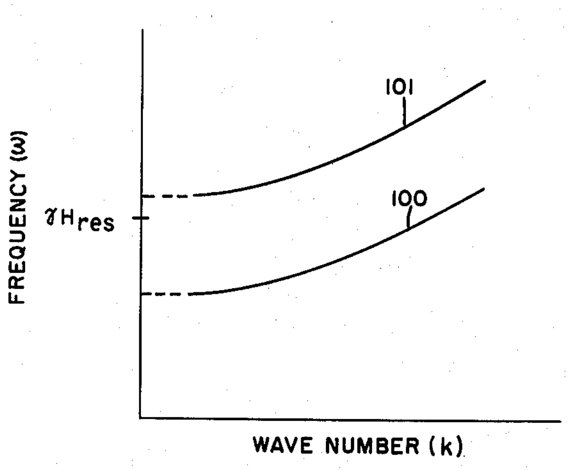
FIGURE 3A is a diagram illustrating the dispersion characteristics for a manifold of spin-waves within a ferromagnetic sample such as employed in FIGURE 1.

Shown in FIGURE 3A is the dispersion characteristics for spin-waves within a uniformly magnetized ferromagnetized ferromagnetic sample such as the body 3, which is the relationship of frequency $\omega$ to wave number $k$ of the spin-waves. The number $k$ is equal to $2\pi/\lambda$ and is often expressed as the phase constant $\beta$. The lower curve 100 shows the $\omega$ vs. $k$ dispersion characteristic for spin-waves traveling in a direction parallel to an applied D.-C. magnetizing field, which has been identified as the Z direction. The upper curve 101 provides the $\omega$ vs. $k$ characteristic for spin-waves traveling in directions orthogonal to the direction of the D.-C. magnetizing field, or in the X–Y plane. Between curves 100 and 101 is a manifold of spin-waves traveling in various directions between the X–Y plane and the Z direction. At the lower $k$ numbers magnetostatic modes are present as indicated by the dashed portions of curves 100 and 101.

For an applied resonant magnetizing field $H_{res}$ corresponding to the resonant frequency $\omega_{res}$ of the applied microwave energy and in response to the orthogonally applied R-F magnetic field of the microwaves, a resonant uniform precessional mode is excited. This mode extends into the body of the sample. It is noted that for low $k$ numbers, magnetostatic modes may also be excited. By reducing the magnetizing field towards the center of the ferromagnetic body, short wavelength spin-waves having a wavelength determined by the internal magnetizing field tend to be excited and supported, and there exists a rather smooth transition from the uniform mode to the short wavelength spin-wave modes in accordance with the variation of the internal field. For a sufficiently decreased internal field in the central region of the sample, as illustrated in FIGURE 2, short wavelength spin-waves of significantly low phase velocity are generated.

Figure 3B:
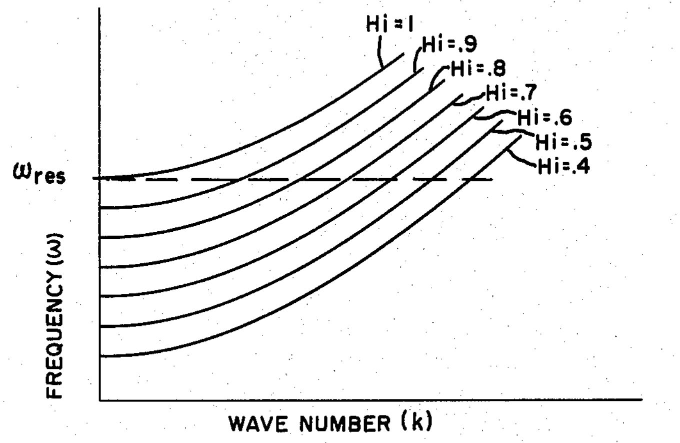
FIGURE 3B is a diagram illustrating a spectrum of spin-wave dispersion characteristics for different magnitudes of internal magnetizing fields.

A spin-wave spectrum for different decreasing values of internal magnetizing fields is presented in FIGURE 3B. From this figure it may be graphically seen how, when the magnetizing field is reduced toward the center of the ferromagnetic body, which has the effect of moving down to lower $H_i$ magnitude curves, spin-waves of the same frequency as the energizing microwave electromagnetic frequency $\omega$ but of decreasing wavelength are excited, where the phase velocity is given by $\omega/k$ and the group velocity by $\sim\omega/\sim k$. Accordingly, short wavelength spin-waves propagate through the sample at a phase and group velocity determined by the internal central magnetizing field. In the terminal region of the ferromagnetic body 3 they are again coupled to the uniform precessional mode by a process exactly opposite to that described. The uniform modes are then readily coupled to the exit portion of the waveguide 2 as electromagnetic energy.

It may be noted at this point, where reflections exist at the exit surface of the body 3, interference with the propagating spin-waves can be avoided by applying the R-F electromagnetic energy to be delayed as a succession of pulses, the pulse width being less than the time delay provided by the ferromagnetic body, which is essentially the time for the excited spin-waves to propagate through the body.

In addition, a variable delay may be readily provided by adjusting the magnitude of the internal magnetizing field in the central region of the sample. The phase velocity having been shown to be a function of the magnitude of the magnetizing field, the delay provided by the delay line is inversely related to the magnetizing field at the central portions of the ferromagnetic body.

Figure 3C:
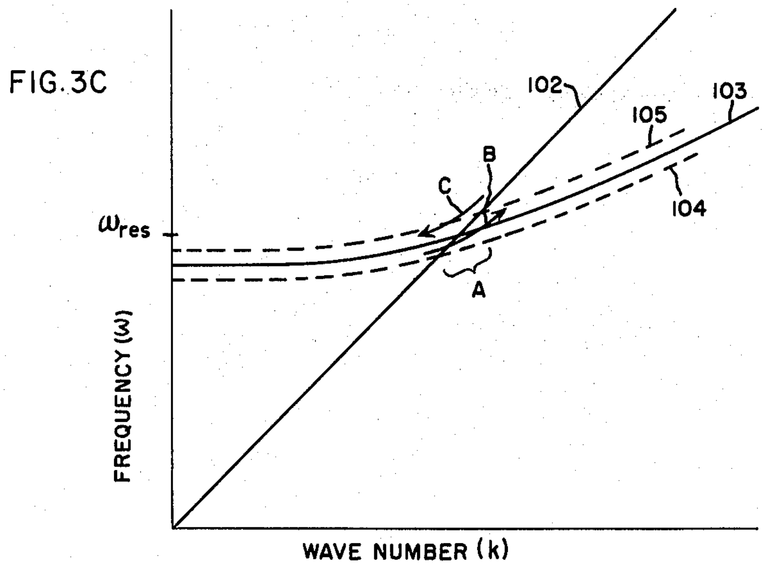
FIGURE 3C is a diagram illustrating the dispersion characteristics for spin-waves and acoustic waves within a ferromagnetic sample and the interaction effects that exist between the two types of waves.

As a further consideration with respect to propagating spin-waves that have been excited as described above, the phase velocity of the traveling spin-waves is of the same order as and may be readily matched to the phase velocity of acoustic waves of the same frequency within the ferromagnetic body. By accomplishing this, energy may be exchanged between the traveling spin-waves and the traveling acoustic waves with relatively little loss. In FIGURE 3C there are illustrated $\omega$ vs. $k$ diagrams 102 and 103 for acoustic waves and spin-waves, respectively. For a given resonant $\omega_{res}$ frequency, adjusting the magnetizing field obtains traveling spin-waves of the proper phase constant, which phase constant is matched to that of the acoustic waves. This is seen to occur at the crossover region of the two diagrams denoted a "A". As the internal D.-C. magnetizing field is reduced, as indicated by the dashed curve 104, so as to tend to reduce spin-wave phase velocities for said given frequency, energy will be transmitted in the region of "A" primarily in one direction from the spin-waves to the acoustic waves, represented by the arrow B. As the magnetizing field is increased, as indicated by the dashed curve 105, the opposite is true. The spin-wave phase velocities tend to increase and energy will transfer from the acoustic waves to the spin-waves, represented by arrow C.

Figure 4:
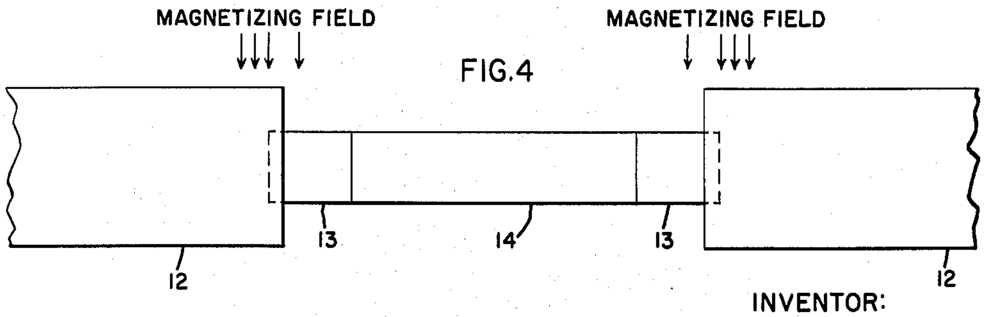
FIGURE 4 is a schematic diagram of an elongated delay line in which energy is transferred between spin-waves and acoustic waves.

The above characteristics find application in the delay line of FIGURE 4 which provides a relatively long time delay. In FIGURE 4 there is illustrated a waveguide 12 for coupling electromagnetic microwave energy into a ferromagnetic body 13, preferably a YIG piece. The body 13 has its optically smooth exit surface in close contact with the optically smooth entrance surface of an elongated member 14 having high Q properties for acoustic microwaves and capable of being fabricated with relatively large dimensions for providing acoustic microwave propagation with long delay and low loss. A quartz material is suitable for the member 14. Coupled in close contact with the exit surface of member 14 is a second ferromagnetic body 13′, which is similar to the body 13, the output region of which is coupled to the terminal portion of waveguide 12. The members 13, 14 and 13′ may be in the form of rods, slabs or other suitable configurations for propagating traveling spin and acoustic waves in the members 13 and 13′ and propagating acoustic waves in the member 14.

Figure 5:
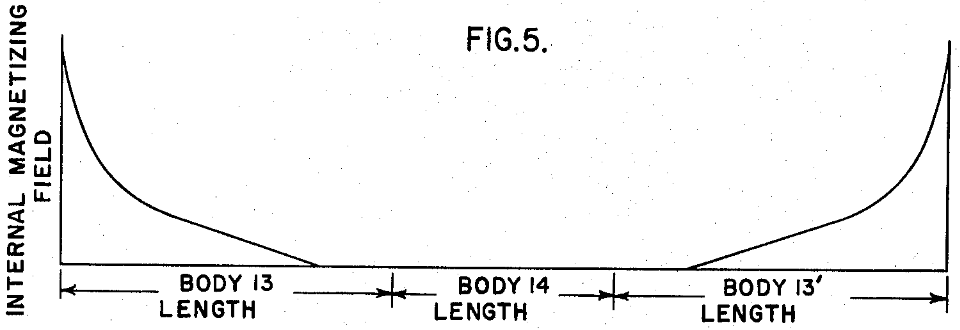
FIGURES 5 illustrates the internal magnetizing field configuration associated with FIGURE 4.

A nonuniform internal magnetizing field is applied to the bodies 13 and 13′ approximately as shown in FIGURE 5 for converting spin-waves to essentially pure acoustic microwaves in the body 13, and for converting back from acoustic microwaves to spin-waves in body 13′. Thus, the ferro-magnetic body 13 has acoustic waves excited therein by applying an internal magnetizing field which decreases the phase velocity of the excited traveling spin-waves to provide a total transfer of energy into acoustic waves. The acoustic waves propagate through the body 13 and can be efficiently coupled into the quartz member 14. Upon propagating through the member 14, the acoustic waves are coupled to body 13′. In body 13′ the internal magnetizing field is progressively increased so as to support spin-waves of a phase velocity greater than that of the acoustic waves whereby energy is transferred back into spin-waves, which energy may then be readily coupled into electromagnetic energy.

The described embodiment has application where relatively long delay times are required since low loss ferromagnetic bodies such as YIG cannot, in the present state of the art, be fabricated into large sizes.

Figure 6:
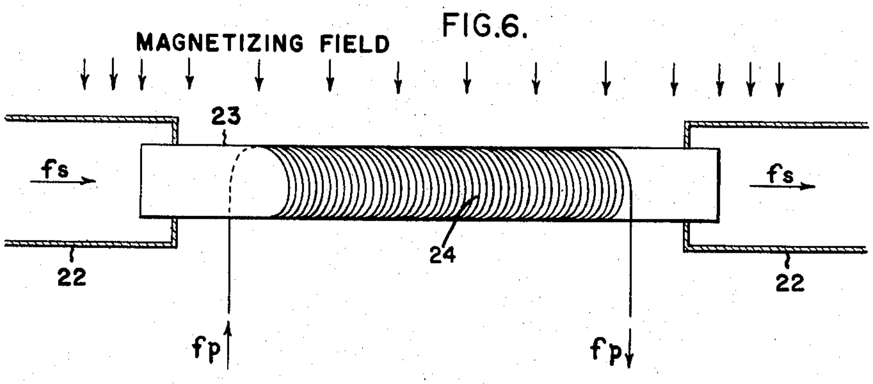
FIGURE 6 is a schematic diagram of a spin traveling wave parametric amplifier in accordance with another embodiment of the invention.

Referring now to FIGURE 6 there is illustrated a spin traveling wave parametric amplifier in accordance with another embodiment of the invention. A waveguide 22 couples microwave electromagnetic energy to a ferromagnetic body 23, e.g., a YIG cylinder. A nonuniform D.-C. magnetizing field is applied thereto in the Z direction for providing excitation of traveling spin-waves in the Y direction along the length of the body in a manner as previously taught. In addition, a helix 24 is tightly wound about the rod 23 for propagating microwave electromagnetic energy at a phase velocity commensurate with that of the traveling spin-waves, the phase velocity being equal to $C/\pi DN$, where C is the velocity of light; D is the helix diameter; and N is the number of turns per unit distance.

Figure 7:
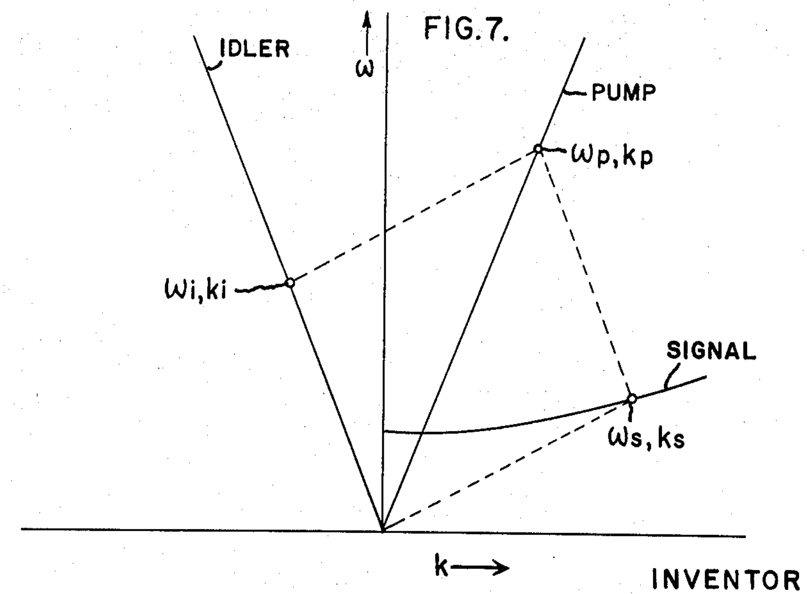
FIGURE 7 is a diagram illustrating the dispersion characteristics for the traveling waves in the amplifier of FIGURE 6.

The signal is applied to the waveguide 22 as microwave electromagnetic energy for propagation as a spin-wave in the ferrite rod 23. The pump microwave energy is applied to the helix 24. Parametric interaction between the signal traveling spin-waves and the magnetic field of the pump electromagnetic microwaves occurs for the proper frequency $\omega$ and phase constant $\beta$, or $k$ number, relationships of the pump, signal and idler waves. These relationships are shown in FIGURE 7 in which there are drawn the $\omega$ vs. $k$ diagrams for the three waves. From an examination of the diagrams and the parallelograms drawn it is seen that the necessary constraints for parametric interaction are satisfied, namely:

$$\omega_p=\omega_s+\omega_i \quad (4)$$

and $$\beta_p=\beta_s+\beta_i \quad (5)$$

It is noted that the idler wave in this case is propagated by the helix in the backward direction.

Figure 8:
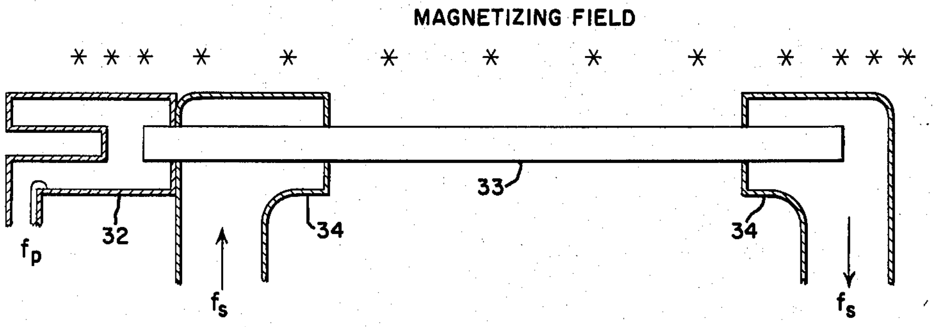
FIGURE 8 is a schematic diagram of a phonon spin traveling wave parametric amplifier in accordance with the invention.
Figure 9:
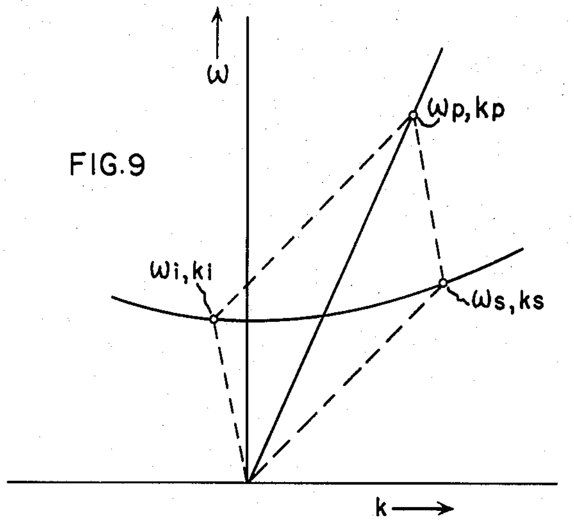
FIGURE 9 is a diagram illustrating the dispersion characteristics for the traveling waves in the amplifier of FIGURE 8.

In FIGURE 8 there is illustrated a phonon spin traveling wave parametric amplifier. The amplifier includes a re-entrant cavity phonon transducer 32 to which is coupled the pump microwave electromagnetic energy, said energy being converted into acoustic energy which is coupled to and propagated along the length of a ferromagnetic body 33, typically a YIG or ferrite rod but not limited thereto. The signal microwave electromagnetic energy is propagated through a waveguide 34 and coupled to traveling spin-waves in the body 33 by means of a nonuniform D.-C. magnetizing field, as described heretofore. By proper adjustment of the magnetizing field, spin-wave velocities commensurate with that of the acoustic wave are obtained so as to provide the necessary $\omega$ and $k$ constraints for parametric interaction between pump, signal and idler waves, where the idler energy may be in the form of backward traveling spin-waves. The $\omega$ vs. $k$ diagrams for the three waves illustrated in FIGURE 9 are typical.

It is noted that spin-waves propagating in a direction orthogonal to the D.-C. magnetizing field have been adverted to in the specifically described embodiments of the invention. However, it may be readily appreciated that spin-waves traveling in other than the orthogonal directions may also be excited and usefully employed by means of the present teaching.

Although invention has been described with respect to a few specific exemplary embodiments for the purpose of clear disclosure, it is recognized that numerous modifications may occur to those skilled in the art. The appended claims are intended to include all modifications falling the true scope and spirit of the invention.

What I claim as new and desire to secure by Letters Patent of the United States is:

1. A spin traveling wave parametric amplifier comprising:

(a) a ferromagnetic rod of high Q, low loss dielectric material, said rod having entrance and exit end regions, (b) microwave transmission means coupled to the end regions of said rod for applying to said entrance region a signal wave in the form of R.-F. electromagnetic energy and for receiving from said exit region said signal after being amplified by a traversal of said rod, (c) means for providing a nonuniform internal D.-C. magnetizing field to said rod having a magnitude in the vicinity of said entrance and exit regions which supports excitation of the uniform precessional spin mode, the magnitude of said field being reduced to a lower value at the central region of the rod for supporting excitation of short wavelength spin-waves of frequency $\omega_s$ and phase constant $\beta_s$ propagating in a direction from said entrance region to said exit region, said electromagnetic energy being successively coupled to said spin-waves and back to electromagnetic energy, (d) a helical conductor tightly wound about said rod, and (e) means for applying to said conductor a pump wave in the form of R.-F. electromagnetic energy of frequency $\omega_p$ and phase constant $\beta_p$ propagating in a direction along that of said spin wave propagation, the magnetic field of the pump wave being coupled to the spin waves with the existing relationships $\omega_p=\omega_s+\omega_i$ and $\beta_p=\beta_s+\beta_i$, where $\omega_i$ and $\beta_i$ are the frequency and phase constant of the idler wave, whereby parametric interaction is provided between the pump and signal waves.

2. A phonon spin traveling wave parametric amplifier comprising:

(a) a ferromagnetic rod of high Q, low loss dielectric material, said rod having entrance and exit end regions, (b) microwave transmission means coupled to the end regions of said rod for applying to said entrance region a signal wave in the form of R.-F. electromagnetic energy and for receiving from said exit region said signal after being amplified by a traversal of said rod, (c) means for providing a nonuniform internal D.-C. magnetizing field to said rod having a magnitude in the vicinity of said entrance and exit regions which supports excitation of the uniform precessional spin mode, the magnitude of said field being reduced to a lower value at the central region of the body for supporting excitation of short wavelength spin-waves of frequency $\omega_s$ and phase constant $\beta_s$ propagating in a direction from said entrance region to said exit region, said electromagnetic energy being successively coupled to said spin-waves and back to electromagnetic energy, (d) a resonant cavity means coupled to said entrance end region, and (e) means for applying to said resonant cavity means a pump wave in the form of R.-F. electromagnetic energy for generating within said rod phonon energy of frequency $\omega_p$ and phase constant $\beta_p$ propagating in a direction parallel to that of said spin wave propagation, the energy of the pump wave being magnetostrictively coupled to the spin waves with the existing relationship $\omega_p=\omega+\omega_i$ and $\beta_p=\beta_s+\beta_i$, where $\omega_i$ and $\beta_i$ are the frequency and phase constant of the idler wave, whereby parametric interaction is provided between the pump and signal waves.

References Cited by the Examiner

UNITED STATES PATENTS 3,012,203 12/1961 Tien ---------------- 330—4.6

OTHER REFERENCES

"Advances in Quantum Electronics," Edited by Singer, Columbia University Press, 1961, pp. 437–452 (Article by Schlomann).

NATHAN KAUFMAN, *Primary Examiner.*

ROY LAKE, *Examiner.*

D. HOSTETTER, *Assistant Examiner.*